United States Patent [19]

Huspen

[11] Patent Number: 5,125,863
[45] Date of Patent: Jun. 30, 1992

[54] TOY SAFETY RESTRAINT

[76] Inventor: Fred Huspen, 2176 Wilderness Dr., Berrien Springs, Mich. 49013

[21] Appl. No.: 620,152

[22] Filed: Nov. 29, 1990

[51] Int. Cl.⁵ .............................................. B60R 22/10
[52] U.S. Cl. .................................. 446/268; 244/142; 297/467
[58] Field of Search ...................... 446/26, 27, 28, 71, 446/72, 73, 227, 268, 369, 385, 901, 50, 51; 297/467, DIG. 6; 244/142, 151 R; 128/846

[56] References Cited

U.S. PATENT DOCUMENTS

| | | | |
|---|---|---|---|
| 1,504,103 | 8/1924 | Davin et al. | 244/142 |
| 1,509,410 | 9/1924 | Ruff | 244/142 |
| 2,324,421 | 7/1943 | Ovellette | 297/467 X |
| 2,643,836 | 6/1953 | Carroll | 244/151 R |
| 2,711,296 | 6/1955 | Clark | 446/28 X |
| 3,301,594 | 1/1967 | Pukish, Jr. | 297/467 |
| 3,325,213 | 6/1967 | Levy | 297/467 |
| 4,423,834 | 1/1984 | Rush | 446/268 X |
| 4,871,210 | 10/1989 | Alexander et al. | 297/467 X |

Primary Examiner—Robert A. Hafer
Assistant Examiner—Sam Rimell
Attorney, Agent, or Firm—Welsh & Katz, Ltd.

[57] ABSTRACT

A toy safety restraint configured for use with a doll to simulate a safety restraint of the type worn by a child while riding in a vehicle, and thus encourage the use of such restraints, includes a padded panel adapted to be worn on the back of the doll and a harness operationally associated with the panel for securing the panel to the back of the doll in the manner in which such restraints are actually worn by children.

14 Claims, 2 Drawing Sheets

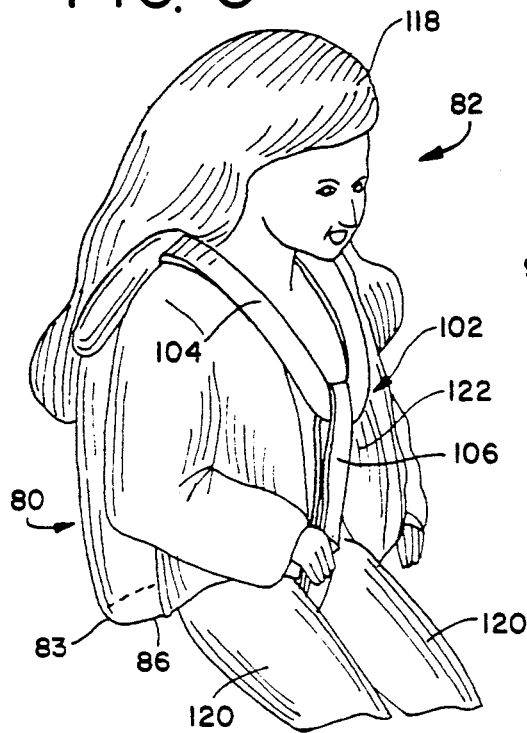
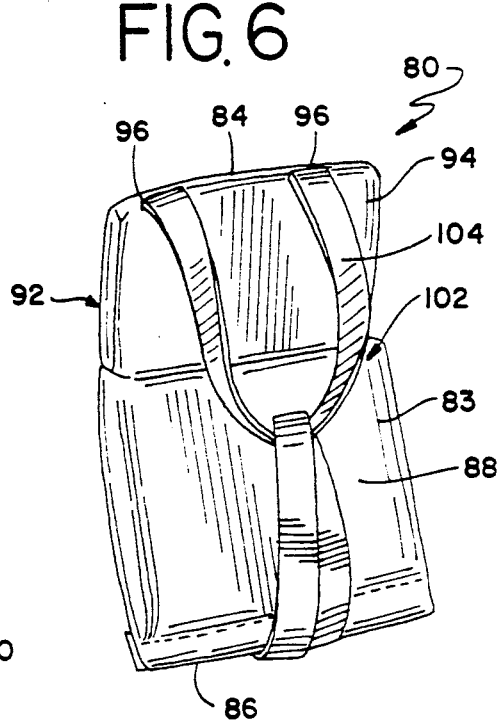
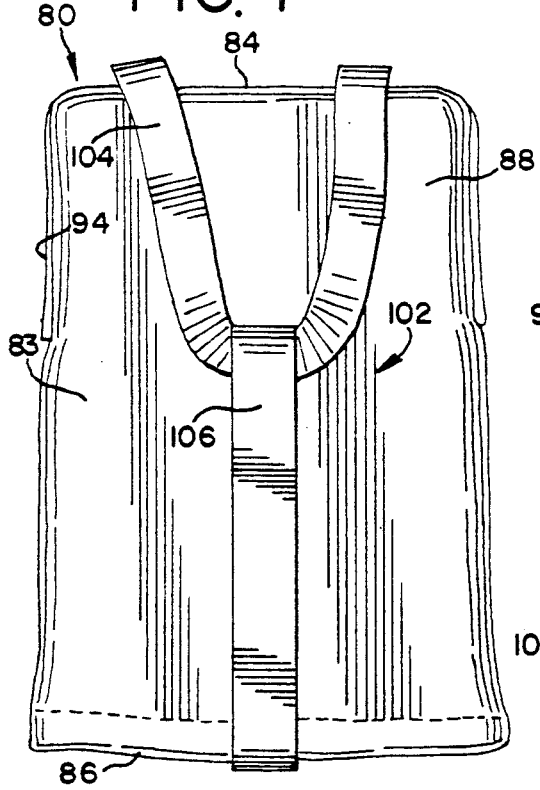
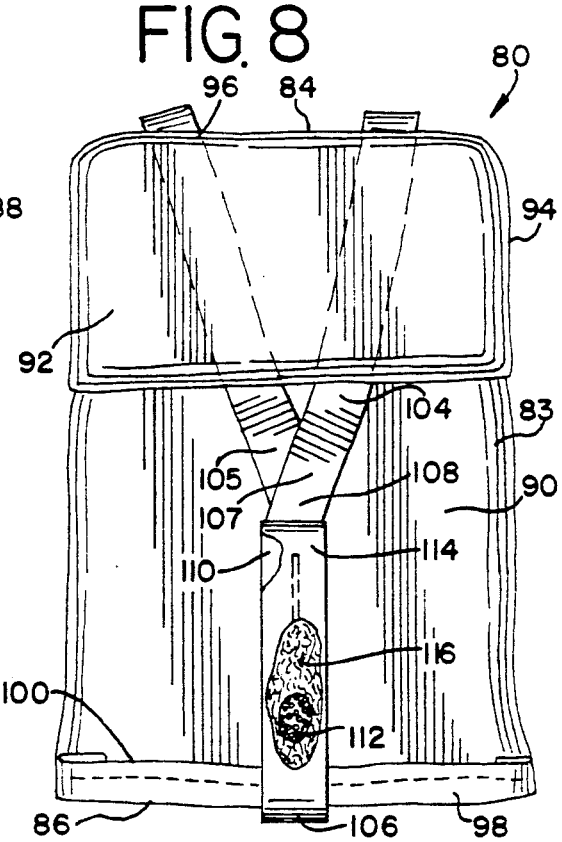

TOY SAFETY RESTRAINT

BACKGROUND OF THE INVENTION

The present invention relates to safety restraints adapted to be worn by children and specifically relates to a toy restraint which is designed to be worn by dolls to encourage the use of such restraints by children.

In my copending application entitled CHILD SAFETY RESTRAINT, filed Nov. 2, 1990 and issued as U.S. Pat. No. 5,074,588, I disclosed a device to be worn by children in vehicles. Such a safety restraint is used for children who have outgrown conventional "car seats" and who are not large enough to wear conventional vehicle shoulder belts. The device basically includes a rigid plate having a first pair of slots dimensioned to accommodate the vehicle lap and/or shoulder belts, and also a second set of slots dimensioned to accommodate the straps of a harness. The plate is covered by foam padding for the comfort and protection of the wearer. A harness having shoulder and crotch straps is slidably engaged in the plate and includes a buckle system for securing the shoulder straps and the crotch strap to each other in front of the child.

When the plate is fastened to the vehicle seat through the belt and/or shoulder straps, the child may be buckled into the harness. In this manner, should the vehicle be subject to sudden deceleration or impact, the child wearing my restraint is protected from injury due to the so-called "envelope effect", where the child's head plunges forward and touches his knees.

In view of the natural resistance of children to voluntarily subject themselves to a confining situation, there is a need for a way to help convince and reassure children that the wearing of such a safety restraint is not unpleasant. There is also a need for a way to encourage children to use the restraint.

SUMMARY OF THE INVENTION

Accordingly, in order to address the above-identified objectives, a toy safety restraint is provided which is configured to be worn by dolls to simulate a safety restraint of the type worn by children in vehicles, and thus encourage the use of such restraints. The present toy safety restraint includes a padded panel adapted to be worn on the back of a doll, and a harness operationally associated with the panel for securing the panel to the doll in the manner which simulates how such restraints are actually worn by children. If desired, the restraint may be provided in embodiments which may be worn by stuffed animal dolls, or by "fashion" dolls or human-type figures.

BRIEF DESCRIPTION OF THE DRAWINGS

FIG. 5 is a front perspective elevational view of an alternate embodiment of the present toy safety restraint shown worn by a fashion doll;

FIG. 6 is a front perspective elevational view of the restraint of FIG. 5;

FIG. 7 is a front elevational view of the restraint depicted in FIG. 6; and

FIG. 8 is a rear elevational view of the restraint of FIG. 7.

DETAILED DESCRIPTION OF THE PREFERRED EMBODIMENT

Figure 1:
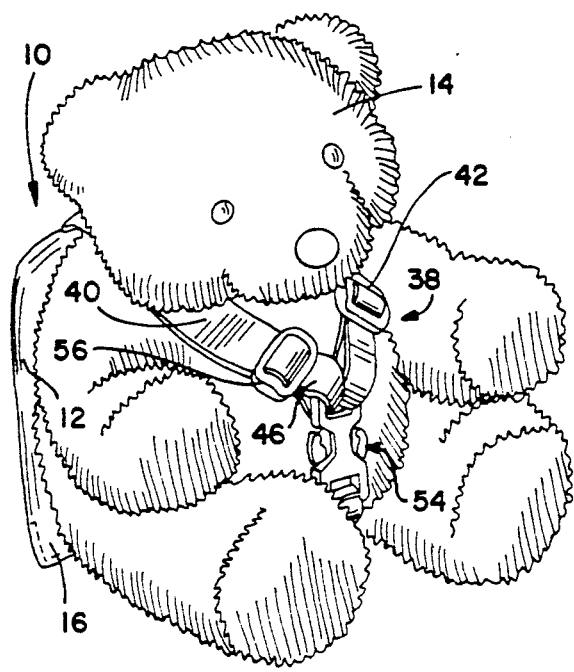
FIG. 1 is a front perspective elevational view of the present toy safety restraint shown worn by a stuffed animal doll.
Figure 2:
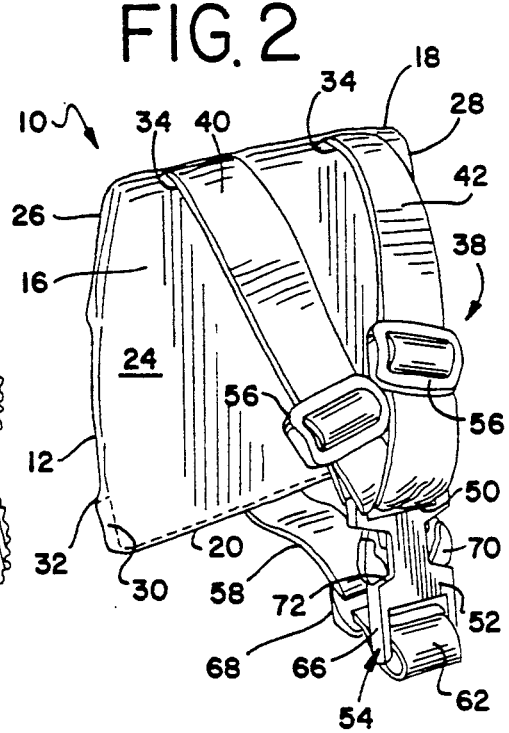
FIG. 2 is a front perspective elevational view of the restraint of FIG. 1.
Figure 3:
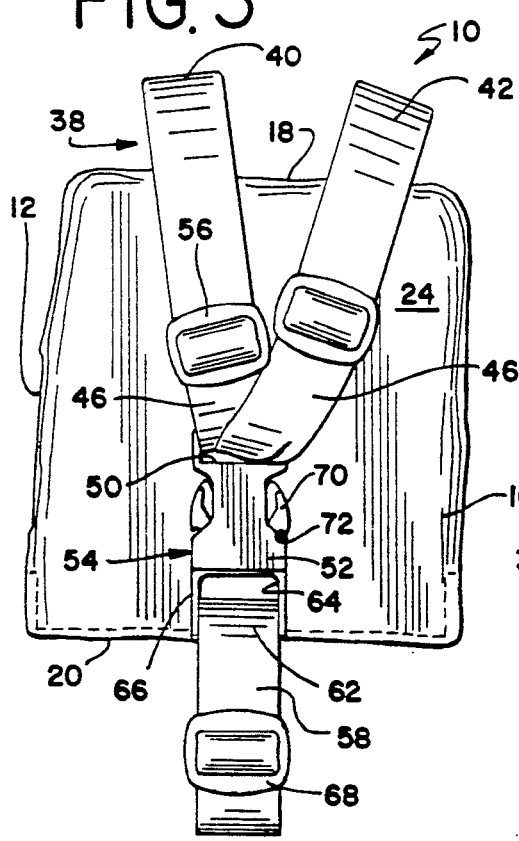
FIG. 3 is a front elevational view of the restraint of FIG. 2.
Figure 4:
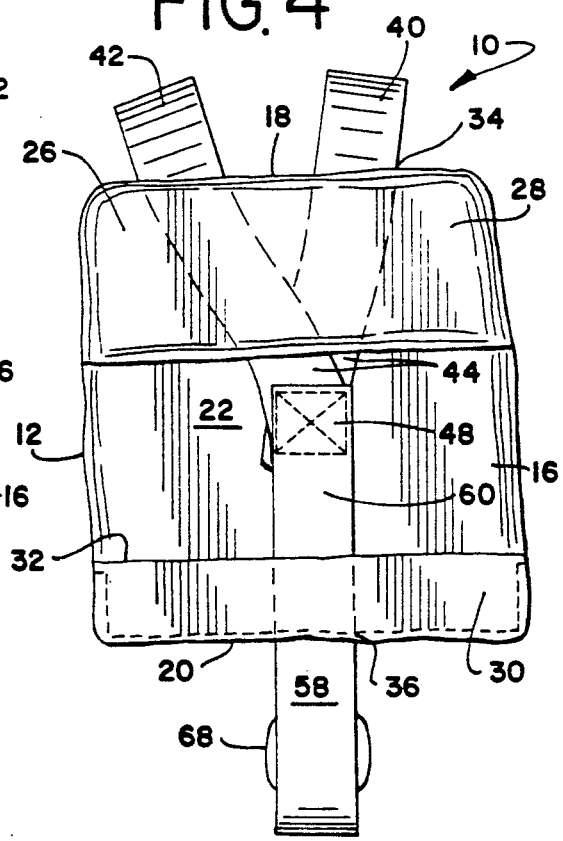
FIG. 4 is a rear elevational view of the restraint of FIG. 3.

Referring now to FIGS. 1-4, the present toy safety restraint is generally designated 10. The restraint 10 includes a padded panel 12 adapted to be worn on the back of a doll 14, the panel preferably being a square or rectangle of resilient foam such as polyurethane foam which is enclosed by a cover 16. The cover 16 may be made of any material which is washable and wear resistant; however a preferred material is nylon. The panel 12 has an upper edge 18, a lower edge 20, a rear surface 22 and a front surface 24.

In the preferred embodiment, the panel 12 is provided with a yoke 26 disposed at an upper portion 28 of the rear surface 22, and a lower flap 30 disposed along the lower edge 20 so as to define an upwardly opening pocket 32. The yoke 26 and the flap 30 are preferably fixed to the panel 12, such as by stitching or adhesive. The panel 12 also may include a pair of shoulder strap slits 34 located in the upper edge 18 of the panel or in the yoke 26, and a crotch strap slit 36 (best seen in FIG. 4) centrally located in the lower edge 20.

A harness generally designated 38 is operationally associated with the panel 12 for securing the panel to the back of the doll 14 in a manner which simulates the wearing of any life-size restraint by children. The harness 38 includes a pair of shoulder straps 40 and 42, each of which has a rear end 44, a free end 46, and is preferably made of a webbed material. The rear ends 44 are secured to each other as by stitching or adhesive at a point 48. In the preferred embodiment, the straps 40, 42 are fixed in place, as by stitching or adhesive near the upper edge 18 between the panel 12 and the yoke 26. It is also contemplated that the straps 40, 42 may be each inserted through a corresponding shoulder strap slit 34 at the upper edge 18 of the panel 12 or in the yoke 26 and brought through to the front 24 of the panel.

After being drawn between the corresponding upper edges of the panel 12 and the yoke 26 to the front of the panel 12, the free ends 46 of each of the straps 40, 42 are each looped through an eyelet 50 of the female portion 52 of a quick release buckle 54. Each of the free ends 46 is then preferably secured to the straps 40, 42 by a buckle 56, which may also be used to adjust the length of the shoulder straps in a similar manner to the straps in the life-sized vehicle safety restraint.

The harness 38 is also provided with a crotch strap 58, being preferably made of a similar webbing material as the straps 40, 42 and having a rear end 60 and a free end 62. The rear end 60 is preferably attached to the shoulder straps, 40, 42 at the point 48, such as by stitching or adhesive. The strap 58 is then preferably fed between the lower edge 20 and the flap 30, or if desired, through the crotch strap slit 36 in the lower edge 20 of the panel 12. The free end 62 of the strap 58 is then looped through an eyelet 64 in the male portion 66 of the quick release buckle 54. A buckle 68 secures the free end 62 to the main portion of the crotch strap 58 in a similar fashion to the buckle 56. The buckle 68 may also be used to adjust the length of the crotch strap 58.

In the preferred embodiment, the male portion 66 has a pair of biased finger-like prongs 70 which lockingly and releasably engage corresponding openings 72 in the female portion 52. The buckle 54 may be released by squeezing the prongs 70 together and pushing the male portion 66 downwardly and out of the female portion 52. Although a simulated plate is not provided, the present toy safety restraint 10 thus approximates the outward configuration of the full size child's vehicle safety restraint disclosed in my U.S. Pat. No. 5,074,588.

Referring now to FIG. 1, the restraint 10 is shown worn by the doll 14 which is depicted as a stuffed animal doll, and the restraint may be provided in sizes which are in scale with the size of the doll. Using the harness 38, the restraint 10 may be easily removed from the doll 14 by a child and replaced upon the same or upon another doll. Also, the present restraint 10 is placed upon the doll 14 in the same manner as the child puts on his or her own restraint, so that the child becomes familiar with the restraint and is less likely to object to wearing it while riding in a vehicle.

Referring now to FIGS. 5-8, an alternate embodiment of the present toy restraint is generally indicated at 80. The restraint 80 is designed for dolls which are too small to wear the restraint 10, and specifically for fashion dolls or realistic human-type figures 82 such as the popular BARBIE ® dolls manufactured by Mattel, Inc.

In general terms, the restraint 80 is similar to the restraint 10, with the principal differences resulting from miniaturization and simplification of the harness. Thus, the restraint 80 includes a panel 83 which is preferably padded in similar fashion to the panel 12, although other configurations are contemplated.

The panel 83 has an upper edge 84, a lower edge 86, a front surface 88 and a rear surface 90. The rear surface 90 includes a yoke 92 disposed at an upper portion 94 and attached thereto, such as by stitching or adhesive. Two shoulder strap slits 96 may be located in the upper edge 84 or in the yoke 92. A transverse flap 98 is secured, preferably by stitching, to the lower edge 86 of the rear surface 90 to define an upwardly opening pocket 100. The use of equivalent fasteners for the flap 98 is contemplated.

A harness 102 is generally made up of two strips of ribbon-like material, a first piece 104 forms the shoulder straps, and a second piece 106 forms the crotch strap. The shoulder straps are formed by inserting each free end 105, 107 of the piece 104 from the front 88 of the panel 83 between the corresponding upper edges of the panel 83 and the yoke 92 and fixing the straps in position, as by stitching. Alternatively, the strap ends 105, 107 may be inserted through a corresponding one of the shoulder strap slits 96. The free ends 105, 107 of the piece 104 are then fastened to each other at the rear surface 90 beneath the yoke 92 at point 108.

A rear end 110 of the second piece 106 is also secured to the ends of the piece 104 at the point 108, and is further provided with a fastener, such as a strip 112 of hook and loop fastener material commonly known as VELCRO. A free end 114 of the piece 106 is provided with a complementary fastener, preferably a strip 116 of hook and loop fastener material which is configured to be attachable to the strip 112. It is contemplated that, instead of hook and loop fastener material, equivalent fasteners such as snaps, buttons or hooks and eyes may be used.

The harness 102 is attached to the doll 82 by first looping the piece 104 over the head 118 of the doll and placing the panel 83 on the doll's back. The "crotch strap" 106 is attached to the doll 82 by passing the free end 114 from the lower edge 86 of the panel 83 forwardly between the doll's legs 120 to the front 122 of the doll. The end 114 is then passed over the "shoulder straps" 104 and looped back behind the doll 82 between the legs 120 and under the lower edge 86 to meet the rear end 110 at the point 108. In other words, the strap 106 is folded over itself after being looped over the strap 104. At this time, the two strips 112, 116 of hook and loop fastener material are then placed together to secure the crotch strap 106.

Thus, the present invention provides a toy safety restraint in formats which are easily incorporated into childhood play scenarios including stuffed animal dolls and/or human-like fashion dolls or action figures. The restraints 10, 80 are readily attached to various types of dolls and familiarize the child with the concept and workings of an actual safety restraint which the child wears.

While a particular embodiment of the toy safety restraint of the invention has been shown and described, it will be appreciated by those skilled in the art that changes and modifications may be made thereto without departing from the invention in its broader aspects and as set forth in the following claims.

What is claimed is:

1. A toy safety restraint configured to be worn by a doll, said toy restraint comprising:
    a padded panel adapted to be worn on the back of the doll, said panel having upper and lower edges, a rear surface including a yoke at an upper end, and a lower flap defining a top opening pocket; and
    a harness operationally associated with said panel for securing said panel to the back of the doll, said harness including a pair of shoulder straps and a crotch strap, said shoulder straps being made from a single length of strap, and said crotch strap being looped over said shoulder straps.

2. The restraint as defined in claim 1 further including means for securing portions of said crotch strap to each other.

3. The restraint as defined in claim 1 wherein said means for securing includes complementary strips of hook and loop fastener material.

4. The restraint as defined in claim 3 wherein said harness is configured so that said hook and loop fastener material is disposed adjacent a rear side of said panel when said panel is worn by the doll.

5. A toy safety restraint configured to be worn by a doll, said toy restraint comprising:
    a padded flattened panel adapted to be worn on the back of the a doll, said panel having an upper edge, a lower edge, a front surface, and a rear surface having a yoke disposed at an upper end thereof and a lower flap defining a top opening pocket; and
    a harness operationally associated with said panel for securing said panel to the back of the doll, said harness having a pair of shoulder straps and a crotch strap, a portion of each of said shoulder straps being slidably disposed within said panel for slidable action between said yoke and said panel.

6. The restraint as defined in claim 5 further including means for securing free ends of said shoulder straps to a free end of said crotch strap.

7. The restraint as defined in claim 6 wherein said means for securing includes a quick release buckle.

8. The restraint as defined in claim 6 wherein said shoulder straps are made from a single length of strap, and said crotch strap is looped over said shoulder straps.

9. The restraint as defined in claim 8 further including means for securing portions of said crotch strap to each other.

10. The restraint as defined in claim 6 wherein said shoulder straps and said crotch strap each include means for adjusting their length.

11. The restraint as defined in claim 10 wherein said means for adjusting is a buckle.

12. A toy safety restraint configured to be worn by a doll, said toy restraint comprising:
   a flattened padded panel adapted to be worn on the back of the doll; and
   a harness operationally associated with said panel for securing said panel to the back of the doll, said harness including a pair of shoulder straps and a crotch strap, said shoulder straps being made from a single length of strap, and said crotch strap being looped over said shoulder straps; and
   means for securing portions of said crotch strap to each other, said means for securing including complementary strips of hook and loop fastener material disposed adjacent a rear side of said panel when said panel is worn by the doll.

13. A toy safety restraint configured to be worn by a doll, said toy restraint comprising:
   a padded flattened panel adapted to be worn on the back of the doll, said panel having a rear surface including a yoke at an upper end, and a lower flap defining a top opening pocket;
   a harness operationally associated with said panel for securing said panel to the back of the doll, said harness including a pair of shoulder straps and a single crotch strap, said shoulder straps and said crotch strap are joined to each other adjacent a rear surface of said panel; and
   means for releasably securing free ends of said shoulder straps to a free end of said crotch strap at a single point.

14. The restraint as defined in claim 13 wherein said means for releasably securing includes a quick release buckle.

* * * * *